(12) United States Patent
Richton

(10) Patent No.: US 6,650,902 B1
(45) Date of Patent: Nov. 18, 2003

(54) METHOD AND APPARATUS FOR WIRELESS TELECOMMUNICATIONS SYSTEM THAT PROVIDES LOCATION-BASED INFORMATION DELIVERY TO A WIRELESS MOBILE UNIT

(75) Inventor: Robert Ellis Richton, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/440,047

(22) Filed: Nov. 15, 1999

(51) Int. Cl.[7] ................................................ H04Q 7/20
(52) U.S. Cl. .............................. 455/456.3; 455/414.1; 455/414.3; 455/404.2
(58) Field of Search ............................ 455/456, 456.4, 455/456.3, 404.2, 414.1, 414.3

(56) References Cited

U.S. PATENT DOCUMENTS

| | | | |
|---|---|---|---|
| 5,461,390 A | | 10/1995 | Hoshen |
| 5,502,757 A | * | 3/1996 | Bales et al. .................... 379/58 |
| 5,559,520 A | * | 9/1996 | Barzegar et al. ............ 342/357 |
| 5,938,721 A | * | 8/1999 | Dussell et al. .............. 701/211 |
| 6,115,611 A | | 9/2000 | Kimoto |
| 6,122,520 A | * | 9/2000 | Want et al. .................. 455/456 |

FOREIGN PATENT DOCUMENTS

| | | |
|---|---|---|
| JP | 10-013961 | 9/2000 |
| WO | 97/41654 | 11/1997 |
| WO | 98/08314 | 2/1998 |
| WO | 98/59506 | 12/1998 |
| WO | 99/33293 | 7/1999 |
| WO | 99/45732 | 9/1999 |
| WO | 00/41412 | 7/2000 |

OTHER PUBLICATIONS

"Activehome" website, Oct. 1999.

* cited by examiner

*Primary Examiner*—William Trost
*Assistant Examiner*—Andrew T Harry

(57) ABSTRACT

A wireless telecommunications system uses location or position information of a wireless mobile unit to initiate the sending of location-specific information to travelers. As position information is received, it is compared to prestored position information of a remote location, such as an airport. As the traveler approaches the remote location, and gets within a certain distance the remote location, information such as airline arrival information is retrieved and sent to the wireless mobile unit of the traveler. Thus, useful information tied to the position of the wireless mobile unit, such as airline or traffic information for example, is obtained.

58 Claims, 7 Drawing Sheets

METHOD AND APPARATUS FOR WIRELESS TELECOMMUNICATIONS SYSTEM THAT PROVIDES LOCATION-BASED INFORMATION DELIVERY TO A WIRELESS MOBILE UNIT

BACKGROUND OF THE INVENTION

1. Field of the Invention

The present invention relates to telecommunications in general, and, more particularly, to a wireless telecommunications system.

2. Description of Related Art

FIG. 1 depicts a schematic diagram of a portion of a known wireless telecommunications system, providing wireless telecommunications service to a number of wireless mobile units (e.g., wireless mobile units 101-1 through 101-3) that are situated within a geographic region. The heart of a typical wireless telecommunications system is a wireless switching center ("WSC") 120. Typically, the WSC 120 is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). WSC 120 is responsible for, among other things, establishing and maintaining a call between a first wireless mobile unit and a second wireless mobile unit or, alternatively, between a wireless mobile unit and a wireline mobile unit (e.g., wireless mobile unit 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with wireless mobile units in that cell and also comprises the transmission equipment that the base station uses to communicate with the WSC 120. However, locating wireless mobile units within a cell was often difficult.

Recently, global positioning systems (GPS) have been developed to the point where they are very inexpensive to implement. Thus, such systems may soon be prevalent in wireless mobile units to determine precise location thereof. In addition, in the area of wireless technology, assisted GPS is being developed to improve on normal GPS for position or location detection in wireless mobile units. Further, other known systems already exists (such as known triangulation methods) for precisely locating wireless mobile units. And still others are constantly being developed. Therefore, a need exists to create other uses for the location or position information of wireless mobile units.

Increasingly complex modern life leaves many people eager for means of simplifying their busy lives. While information is readily accessible to aid in day to day situations, the information is general and not tailored to individuals. For example, radios provide information to people, but this information is for the benefit of the general public, or at best a local area. Thus, a need for developing a system which tailors beneficial information to specific individuals exists.

SUMMARY OF THE INVENTION

The present invention is directed to a wireless telecommunications system that uses location or position information to forward specific information to travelers. As position information of a wireless mobile unit of the traveler is received, it is compared to existing stored position information. Based upon the location of the traveler and instruction information stored in association with information identifying the wireless mobile unit, information particularly useful to the traveler is output to the wireless mobile unit.

BRIEF DESCRIPTION OF THE DRAWINGS

The present invention will become more fully understood from the detailed description given hereafter and the accompanying drawings which are given by way of illustration only, and thus are not limiting of the present invention, wherein like reference numerals represent like elements and wherein.

DETAILED DESCRIPTION OF PREFERRED EMBODIMENTS

The illustrative embodiment of the present invention enables the use of both the telecommunications capability and the location-finding capability of a wireless telecommunications system. These capabilities are combined to direct specific information to a user, the information having a relationship with his location. In general, the illustrative embodiment performs two fundamentally distinct steps. In accordance with the first step, the movement of a wireless mobile unit, preferably a wireless phone, is located and an incoming data stream of the user's location is maintained. In accordance with one aspect of the second step, the illustrative embodiment sets geographically based criteria, at the direction of the user, dictating when and what kind of location-based information is retrieved and sent back to the wireless mobile unit. In accordance with another aspect of the second step, information relating to location of the wireless mobile unit is periodically or continually sent to the wireless mobile unit.

Figure 1:
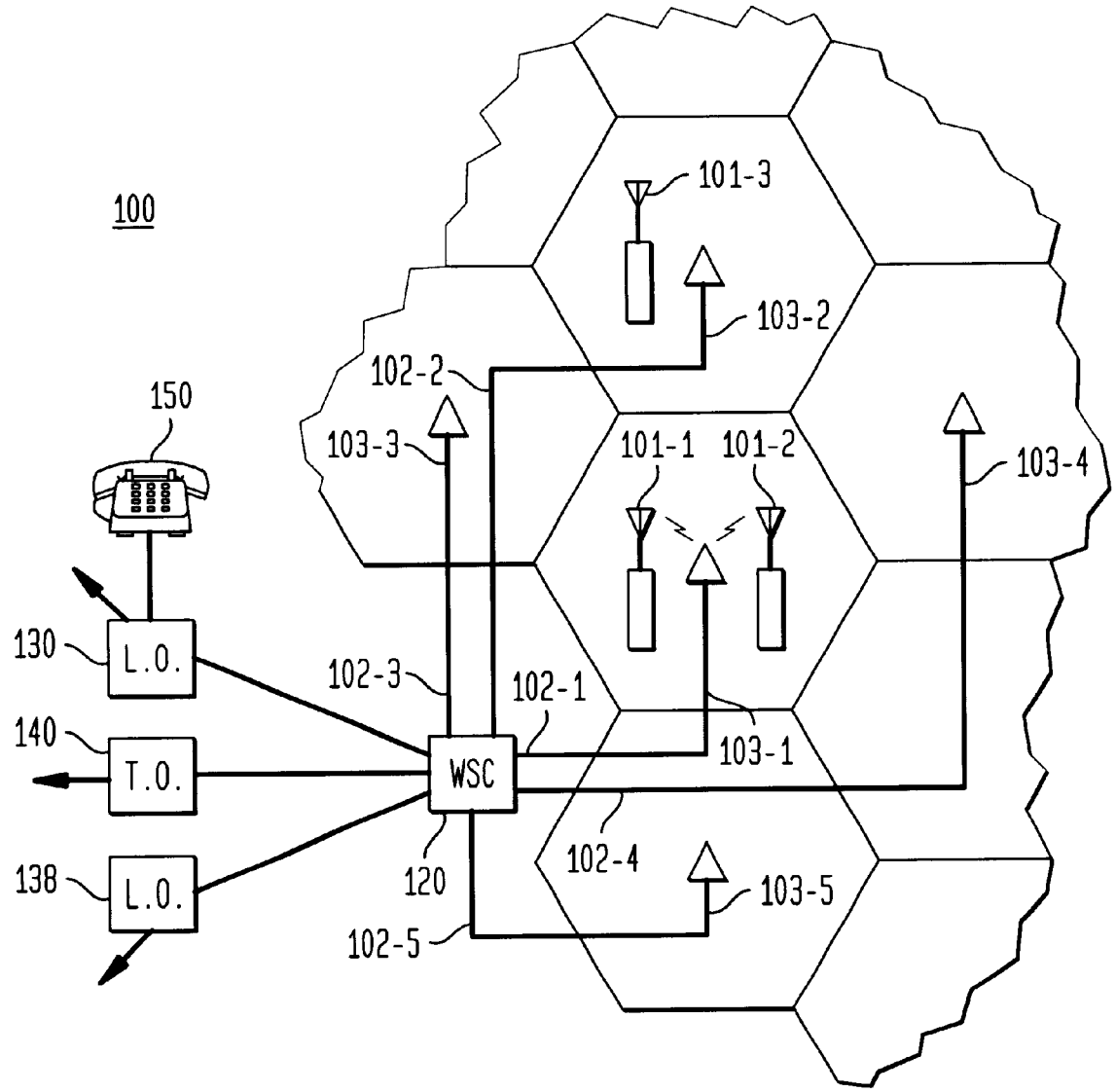
FIG. 1 is a schematic diagram of a known wireless telecommunications system.
Figure 2:
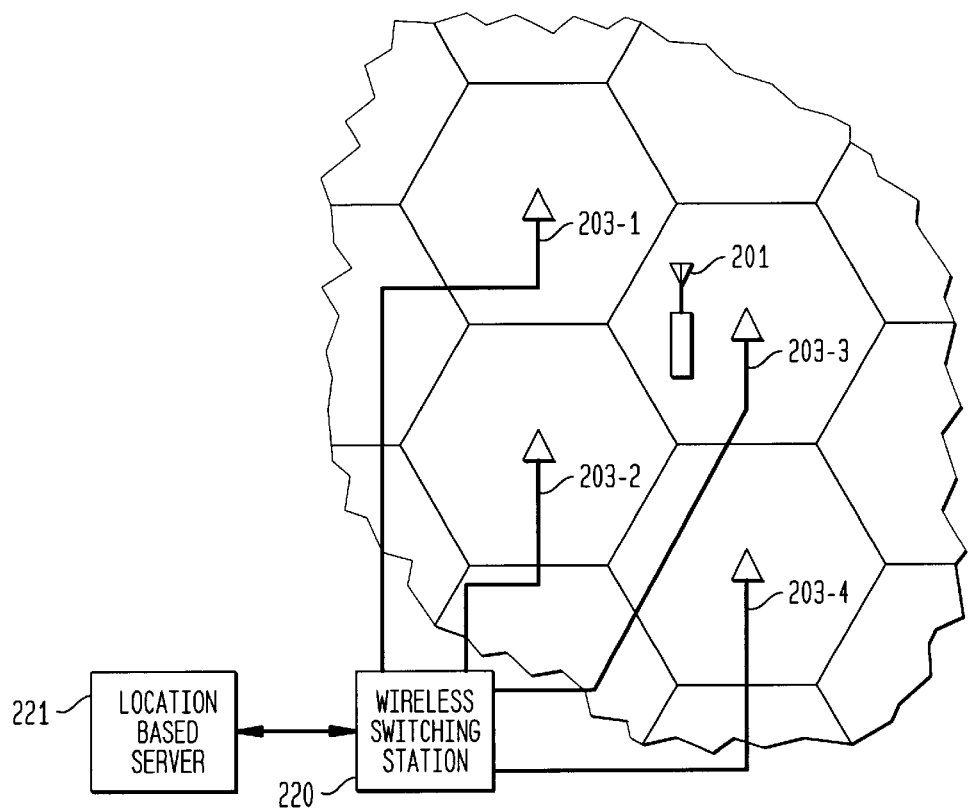
FIG. 2 is a schematic diagram of a wireless telecommunications system including the location-based server of an embodiment of the present invention.

FIG. 2 is a schematic diagram of a wireless telecommunication system including the location-based server 221 of a preferred embodiment of the present invention. The system includes a wireless switching center (WSC) 220 connecting the location-based server 221 with base stations 203-1 through 203-4, wherein it is understood that the number of base stations is exemplary only. Such a system is capable of: (1) providing wireless telecommunications service to wireless mobile unit 201, including location-based services based on location of the wireless mobile unit 201; (2) monitoring the movement (changing location) of wireless mobile unit 201 as it remotely travels; and (3) providing location-based information back to the wireless mobile unit 201, based on the observed changing locations of wireless mobile unit 201. The location-based server 221 is responsible for providing all location-based information services for wireless mobile unit 201.

Figure 3:
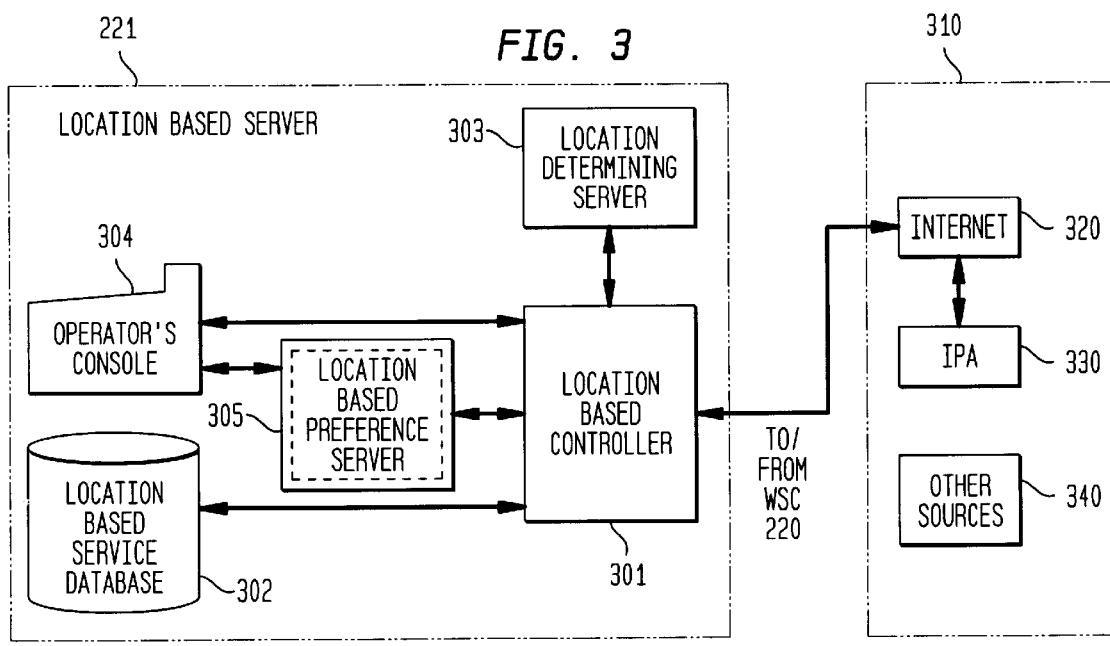
FIG. 3 is a block diagram of the salient components of the location based server of FIG. 2 and connections to external devices.

FIG. 3 is a block diagram of the salient components of location-based server 221. The location-based server 221 includes a location-based controller 301. The location-based controller 301 is connected to each of a location-based service database 302 (a memory, adapted to store: information identifying the wireless mobile unit 201, such as a telephone number; instruction information in association with the telephone number indicating kinds of information to be output for and eventually to the wireless mobile unit 201, such as email, traffic information, airline schedule information, etc.; geographic relationship information, such as position or location threshold information, etc.; as well as remote location information including an airport, an office, etc.); location determining server 303; input device such as a console of an operator 304; and location based preferences server 305. Location based preferences server 305 may optionally be a part of the location-action server 221 that maintains a profile for each supported user and "understands" the preferences users, e.g., airline preference, priorities of importance to a user, etc.

In one preferred embodiment, at least some of such preference information is stored in a personal IPA (intelligent personal assistant) of a user which is linked to the other system components of the location-based server 221 so as to customize information eventually fed back to the user, so as to meet the user's specific desires and preferences. Accordingly, as would be understood by one of ordinary skill in the art, any aspects of the present invention discussed using an IPA could also be done using a centralized location based preferences server 305, and vice-versa.

The location based preferences server 305 translates and cooperates with the location-based service database 302 so as to permit simple commands to be transmitted to the wireless mobile unit 201. Further, the location based preferences server 305 "understands" the user's preferences (e.g., preference for particular airline schedule when the user has approached a threshold, such as within 2 miles of the airport, for example). The location based preferences server 305 matches a user's stored preferences of airlines, for example, to stored location based preferences, such as receiving airline info when within 2miles of the airport, and maintains the user's specified actions and preferences as a user profile, to be invoked whenever the user calls for location-based services. It should be understood that the location based preference server 305 can associate either or both of the aforementioned information or rule based preference information, such as a particular desired airline (although these may be more desirably stored in an IPA due to their changeability), as well as location based geographic relationship triggering preferences (such as when airline scheduling info should be sent, i.e. within 2miles of the airport). Of course, much if not all of this information is stored in the memory of location-based service database 302.

Location-based controller 301 is, for example, a computer programmed to orchestrate location-based services, such as those involving sending data back to the wireless mobile unit 201 (examples of data sent including traffic alerting and location-based advertising). Location-based controller 301 controls the operation of the other elements in location-based server 221.

Location-based service database 302 is a database or memory that additionally preferably contains, among other things, digitized maps of geographic areas serviced by the location-based server 221 and WSC 220. These are used for comparison with a current location of a wireless terminal 201 to determine whether to obtain and send certain information back to the wireless mobile unit 201, through WSC 220 and a controlling base station; and/or to determine what type of information to retrieve and send to the wireless mobile unit 201. The geographic data and related data may be embodied in a Geographic Information System (GIS), for example.

Location-based service database 302 further preferably contains not only the GIS database, but also GIS processing software that enables geographic functions, chiefly determining proximity relationships sometimes enabling the functionality described herein as will be explained in more detail hereafter. Some personal preferences may also be established in location-based service database 302 and/or as part of a location based preferences server 305 and/or as part of an Intelligent Personal Agent (IPA) of a user. These preferences may create an understanding for the processing of information such as particular roads frequently used by the user of a wireless mobile unit 201; airports, offices, or other places that correspond to a set geographic area.

Location-based service database 302 further preferably stores a list of things to be done or information to be gathered in association with a designated wireless mobile unit 201 and the geographic area (distance/proximity thresholds) that will be considered to meet a criteria for initiating information gathering to be performed, eventually leading to some type of information being sent back to the wireless mobile unit 201. These can be customized by the user. For example, information to be gathered when a user approaches the airport can include airline information such as airline flight or flight schedule information, delayed flights, information on connections, information on specific airlines, etc.; and such information can be obtained when a user of a wireless mobile unit 201 has satisfied a geographic relationship with a remote location, such as when the wireless mobile unit 201 is within 10, 15, or 2miles of an airport. Since the type of information desired is most likely variable, this type of information may be stored in an IPA of the user, which is easily linked to a telephone of a user as is known to those of ordinary skill in the art. Such information can also be stored in an optional separate location based preferences server 305; however the need for such a separate server is unlikely as all necessary information can likely be stored in the location based service database 302, with the possible addition of an IPA.

The external information sources 310, including an IPA 330 of a user, the internet 320 and other information sources 340, are preferably established separately from location-based server 221, but in a manner consistent and in communication therewith through location-based controller 301. Any of the internet 320, IPA 330 and other sources 340 can communicate directly with one another and directly with the location-based server 221 through the WSC 220. Information can be requested and received by location-based controller 301 accessing any of the external information sources 310 through WSC 220. Instantiations employing GIS and IPA technologies, while helpful, are not essential to the functionality disclosed herein.

Location-based service database 302 further preferably contains a list of services (or instruction information) to be performed in association with a designated wireless mobile unit 201 and the geographic area (places or remote locations/roads/distance/proximity thresholds) that will be considered to meet a criteria for initiating control of services to be performed (i.e., indicating when a geographic relationship has been satisfied). These can be customized by the user. For example, services performed when a user approaches/leaves his/her home/office (remote location) can include retrieving and forwarding to the wireless mobile unit 201, traffic information specific to the roads on which the user is traveling or will be traveling in the near future. Further, unique remote locations such as airports, for example, can be designated such that when the wireless mobile unit 201 is within a certain distance of an airport and has therefore satisfied a designated geographic relationship with a remote location, airline schedule information is received. Based on stored information, alternate routes of travel can also be provided directly to the wireless mobile unit 201 (when the wireless mobile unit 201 has satisfied a geographic relationship with the remote location or target, such as coming within a predetermined distance thereof, for example). Other types of information forwarded to the wireless mobile unit include, but are not limited to weather information and personal information (such as email, facsimile, voicemail, etc.).

Such services may be performed in conjunction with a home-based IPA 330. This IPA 330 stores specific information such as a user's preferred airlines for example, and is then used to further tailor the information retrieved from an external source based upon stored rules or parameters, so that specific or modified information is sent to the wireless mobile unit 201 to meet a user's needs. The IPA 330 is programmable to tailor information sent to a user, based upon a user's semi-permanent preferences and information specific to circumstances of place and time. For example, the IPA 330 may be programmed to know how to best deliver information because of its programmed knowledge of the user and the prevailing data rates associated with the wireless network and the parts of that network currently serving the user. Furthermore, the IPA 330 is programmable in a known manner to link a user's schedule to other schedules, such as to the schedule of the airlines or other individuals, for example.

The IPA 330 is further programmable in a known manner, with rules that enable it to suggest schedule changes or modifications. These may involve interactions with data that are routinely linked for such circumstances (such as weather data or with the schedules of other people that have extensive interactions with the user). The addition of location dependent data in connection with the present invention, which is then used by such a sophisticated programmable IPA 330 to draw conclusions about scheduling based on its preprogrammed information and based on the user's location, are all factorable into the information transmitted back to the wireless mobile unit 201 of the user. The user can therefore be informed of not only normal flight schedule information, for example, but of suggested changes and reasons for such changes. These may involve application of a simple rule in the IPA 330, such as a desire of the user to wait a short time should that allow the user to be comfortably put on a preferred airline, or very complex rules, such as diverting a user to another airport in a large metropolitan area such as N.Y. city, to provide a user with a desired opportunity to meet new associates.

Similarly, depending on desired services stored in location-based service database 302, various aspects of the internet 320 or other sources 340 (such as traffic information sources) can be tailored or modified by IPA 330 to meet a user's needs. Because so much information has been, and will continue to be, made available over sources like the internet in common, standardized and well known ways, a computer-based application can be written to access many databases including, for example, but not limited to airline flight schedules, schedules of individuals who have granted access to their daily/hourly schedules, road and traffic information, weather, etc. It will be familiar to those of ordinary skill in the art how somewhat diverse information sources can be integrated into a rule-based decision making capability of an IPA 330 or a general purpose computer, in a manner similar to the airline schedule example given above and that all such various uses of diverse information, in combination with location-based information, are encompassed within the scope of the present invention.

It should be noted that rules or specific information can, but need not, be programmed in a remote IPA 330. Any type of information, such as personal information (email, voicemail, facsimile, etc.), airline flight information, traffic information, etc., can be sent directly from a source when a geographic relationship with a remote location is satisfied, and need not involve an IPA 330.

The external information sources 310 receive signals requesting information from location-based controller 301 through the WSC 220 and phone lines; either wireless or land-lines, connected to external information sources 310 in a known manner; and send the requested information back to the location-based controller 301 through the WSC 220 and phone lines, to enable specific information to be sent back to wireless mobile unit 201.

Location determining server 303 determines the location of a wireless mobile unit 201 when requested to do so by location-based controller 301 and provides location-based controller 301 with that information when it is obtained. The location of wireless mobile unit 201 can be determined in a number of known ways including global positioning systems (GPS) and assisted GPS used in conjunction with wireless mobile units and signals 210 sent therefrom, and other known techniques such as triangulation, for example. How the location information is obtained is riot limiting of the present invention. Location-based controller 301, in conjunction with location-based preference server 305, determines the identification of wireless mobile units for which location determining server 303 monitors and identifies position/location information.

Location-based preferences server 305 works in conjunction with location-based controller 301 to determine which wireless mobile units are to be monitored; what are location/geographic relationship thresholds at which information is to be obtained; what information is to be obtained when geographic relationships are satisfied and from where is the information to be obtained; etc. The functioning of location-action and preference server 305 includes the set-up and authorization of users and may use Wireless Intelligent network authorization procedures such as those used for set-up of other wireless services such as call-waiting, voice-activated dialing, etc. Details of the functioning of such service profiles will be familiar to those of ordinary skill in the art, as will there set-up, maintenance and termination. This can be a service that a wireless mobile unit user signs up for, for example. The functioning of the location based preferences server 305 further includes performing of threshold tests and invoking services, when appropriate, as will be described further hereafter. This can be a service that a wireless mobile unit user signs up for, for example.

Operator's console 304 enables travelers (users) to call the location-based server 221 to request a service or change of wireless mobile unit 201 in preference in a user's wireless service file, for example. Thus, stored remote locations/geographic relationships/thresholds/information types, etc. can be modified. Alternatively, the operator's console 304 could be replaced by automated processes, linked to menus in the wireless mobile unit 201 of the user, for example. Some of the functionality described above can be automated by using an understanding of related user preferences, such as the options for different output devices that the user may tie to his/her wireless service file, which may be located elsewhere in the wireless network.

Figure 4:
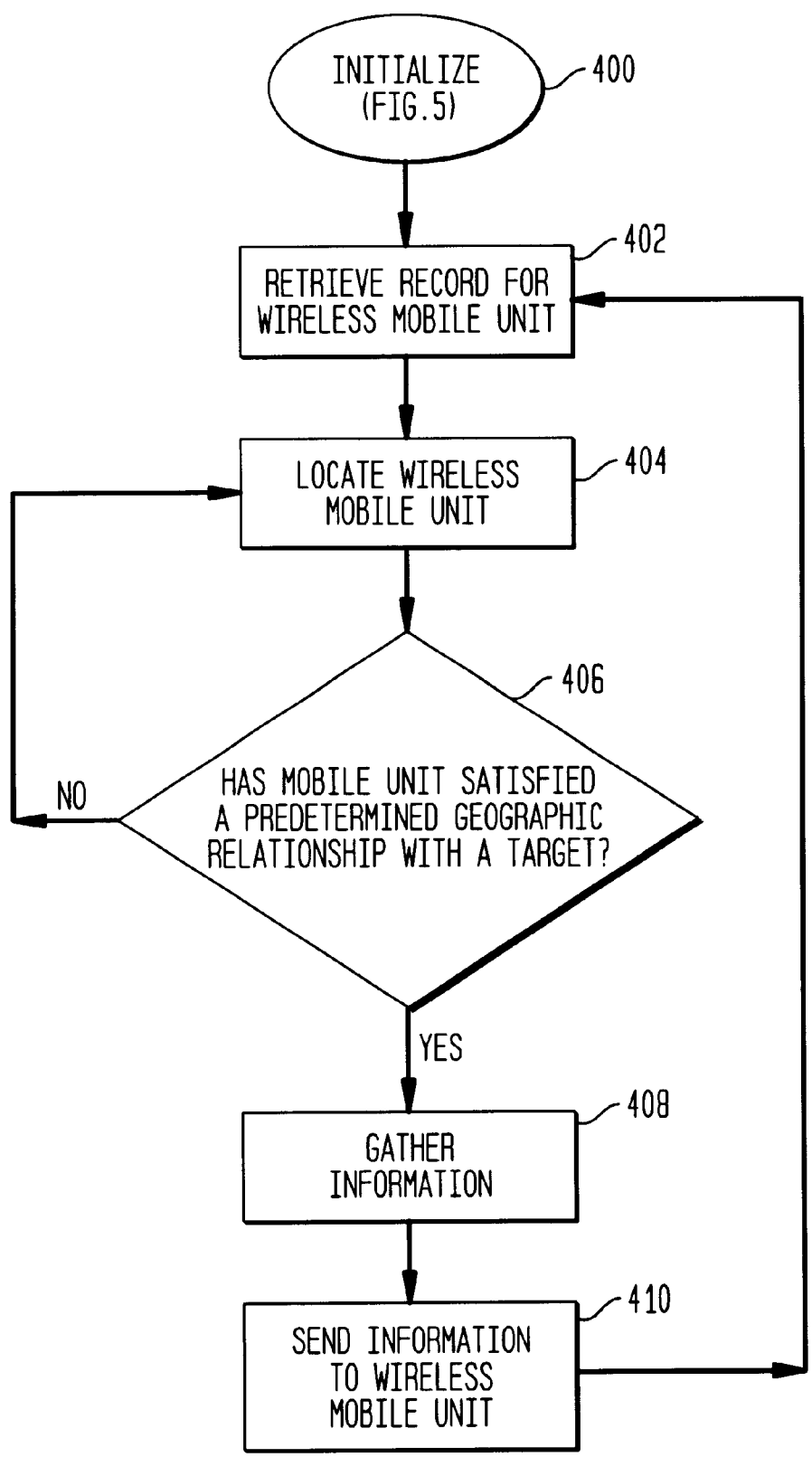
FIG. 4 is a flowchart illustrating operation of an embodiment of the present application.

FIG. 4 is a flowchart of the operation of an illustrative embodiment of the present invention, wherein position/location movement of a wireless mobile unit 201 is preferably tracked as it travels during a trip and wherein that information is then preferably used in near real-time to initiate location-based information retrieval. In doing so, the illustrative embodiment performs two fundamentally distinct, major steps: (1) specifying the desired services by the recording information to be obtained on behalf of the user and the geographic conditions (remote location thresholds, etc.) under which that information will be obtained, and (2) the monitoring of the user's location against the geographic criteria (threshold position for comparison): if the conditions are met, the information will be obtained and some information output for the wireless mobile unit 201; if conditions are not met, position/location monitoring will continue as long as the basis for the service remains.

Prior to step 400 in FIG. 4, a user of a wireless mobile unit 201 initially decides to subscribe to a location-based service. The user may have specific designatable remote locations in mind (which will generally be a familiar location such as road leading from home to office or to a friend's home, for example, or another area for which specific information is requested, such as an airport, for example), and specific information to be collected when a geographic relationship with the designated location is satisfied. It should be noted that the specific type of information, such as a specific airline for which flight information is requested could be programmed in a remote IPA 330 of a user. This can be done in combination with rules including simple rules involving weather data, for example, and complex rules involving arranging connections and flights through a specific city to enable meetings with associates, for example. This information may be associated with routine events, such as the reporting of traffic conditions for the roads leading to the office or coming home from the office; or may include more complex information including alternate route suggestion. The information is retrieved and information is sent to the wireless mobile unit 201 via WSC 220 and a controlling base station, based on the fact that the user has satisfied a set geographic relationship with a designated location, e.g., the information is retrieved and information is sent to the wireless mobile unit 201 when a user is within a certain distance of the designated location (such as the airport, for example) based upon a location of the wireless mobile unit 201 which is with the user. Additionally, prior to step 400 of FIG. 4, the wireless network ascertains that the user is authorized for location-based services—a step which implies the user has a wireless mobile unit 201 that can be located routinely with little impact on the network. This will often be the case.

Initially, the process begins with step 400 of FIG. 4 wherein the process is initialized at the location-based server 221. Information to be obtained, sources from which the information is to be obtained, locations at which services are to be performed, threshold positions/geographic relationships dictating when information is to be obtained, etc., are stored at location-based server 221. Thus, the user essentially subscribes for the service and defines the parameters. This process will be described in more detail with regard to FIG. 5.

Figure 5:
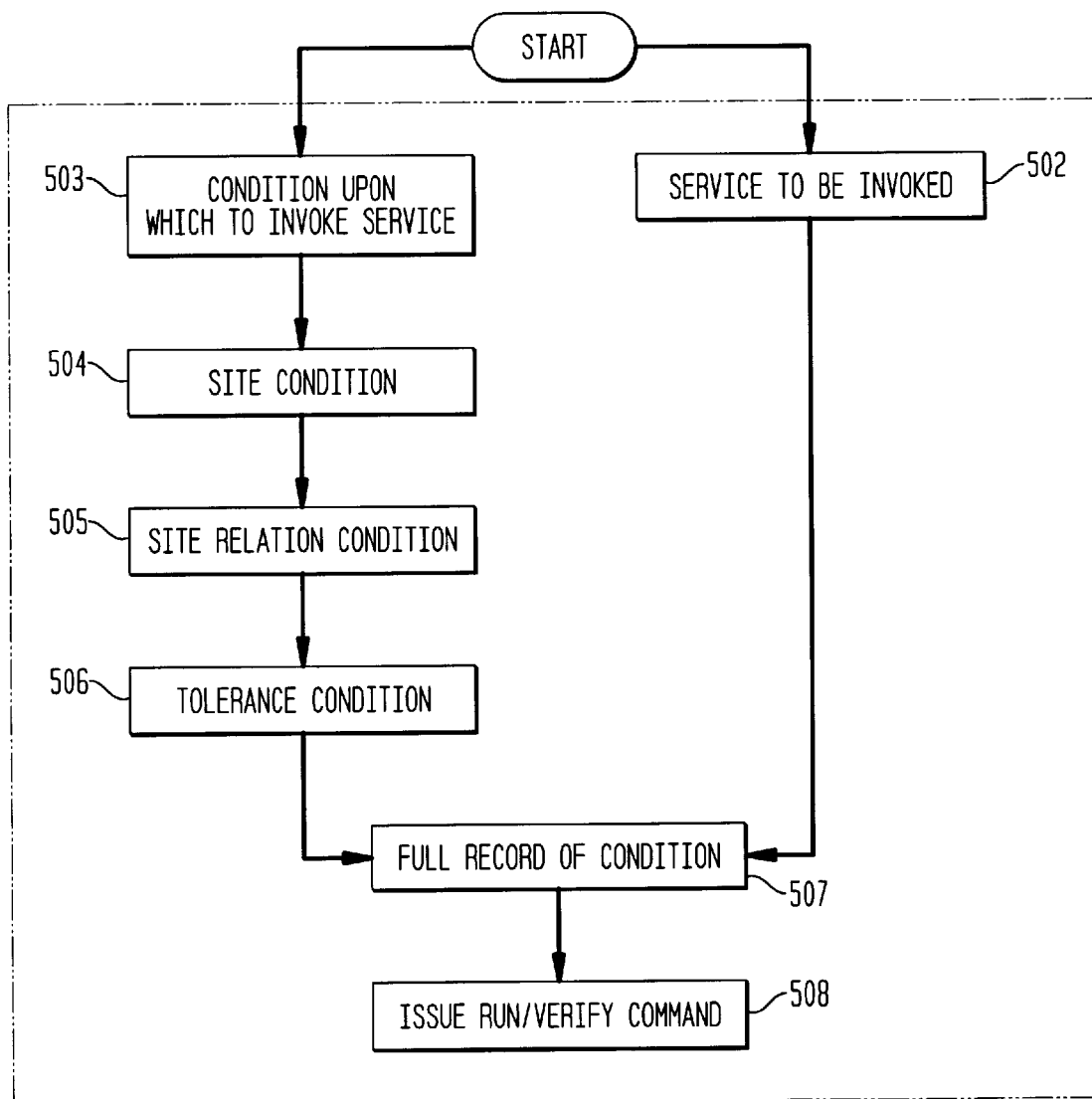
FIG. 5 is a flowchart depicting the registration steps involved in establishing location-based information parameters.

As previously stated, the steps involved in establishing parameters defining where, when, to whom, and what information is to be obtained and sent are described in FIG. 5, further defining step 400 of FIG. 4. Initially, in step 502, the service to be involved is established. A user interface at the wireless mobile unit 201 might include location-based services, such as navigation assistance or location-based traffic reports. The user invokes (subscribes and dictates the parameters desired) the location-based service by initializing, either through a menu on his/her wireless mobile phone 201 or through a similar mechanism such as that which could be provided over the Internet. Alternatives to invoking over the Internet include speaking to an operator or using an IPA (Intelligent Personal Agent). Those skilled in the art will recognize how to construct these various alternative devices for invoking/starting the service, but the menu interface is described further here.

Once in the menu for location-based services, the user interface presents a list of information/service types, and a list of triggering remote locations(home, office, airport, etc.), for example. In more advanced versions, nearly free-form inputs could exist, such that any type of information that could be understood by an intelligent module (IPA) could be included. The list of information can include traffic information or reports, alternate route selection, airline information, personal information such as voice or email, etc.

Besides specifying the information to be obtained in Step 502, the user must specify the geographic conditions under which the service will be invoked in step 503. These are further defined in steps 504 and 506. This establishes the location dictating when information is retrieved; the "location-basis" under which information is obtained; external sources from which information is to be retrieved; how retrieved information is used in determining information ultimately sent to the wireless mobile unit 201 through WSC 220 and a controlling base station; and when information is to be retrieved.

First the user specifies the designated site (remote target location) that is to be the basis of the information retrieval in step 504. The site may be chosen from a pre-programmed list, including such items as "home," "office," "airport," "mother's house," etc. These sites, while using familiar names, will be translated by the location based controller 301 into street addresses, latitude/longitude, UTM (Universal Transverse Mercator), or a similar location designation scheme that can be dealt with by a Geographic Information System (GIS). This, and all other selected information is stored at location-based server 221, preferably in a location-based service database 302.

The geographic criteria or relationship (threshold position/location at which information retrieval is triggered) is set in Step 505 as the Site Relation Condition. The most common criteria will be proximity. For example, as a proximity threshold, the user sets 5 miles such that when the wireless mobile unit 201 is within 5 miles of the designated target location (e.g., the airport), then the determined geographic relationship with the designated target will be satisfied and information retrieval will be triggered (e.g., contact IPA 330, determine commonly selected airline, and contact airport information center through internet to obtain flight information for commonly selected airlines and send to wireless mobile unit 201). It should be noted that geographic relationships triggering information retrieval could also include entry onto a particular road, municipality, or any geographic area. Conversely, it can include leaving any geographic area or reaching a certain distance away from an area or a specific location. Thus, when a user is leaving and is one mile from home, information retrieval of traffic information for nearby or frequently traveled roads can be obtained. Many possible variations can be invoked, particularly if provisioned via a graphical interface such as that included in common GIS or Desktop Mapping schemes (see for examples, the ARC/Info products from ESRI of Redlands, Calif., or MapInfo from MapInfo, Inc, Troy, N.Y.).

Once the user has specified (1) the information to be obtained (e.g. airline flight arrivals), (2) optional modifications of the retrieved information (e.g. include only arrival information for "Delta" and "United"), and (3) the criteria or geographic relationship (typically distance within which to invoke the information retrieval, such as "5 miles" from the airport, for example), the initialization is nearly complete. However, the system may require other internal settings. The most obvious of these is the tolerance, which can be set in step 506. By tolerance, for example, this refers to the fact that when specifying "perform information retrieval when I am within 1 mile ±100 meters", the ± part is yet to be specified. Because of its subtlety, this part may be specified by the system rather than by the user, for example. The initialization Step 400 is completed by writing the Full Record of Condition in Step 507, which writes the information in location-based service database 302. In step 508, it then indicates that the location-based controller 301 may begin its process of verification/authentication, and proceed to begin controlling the service.

Once the process has been initialized, the wireless network then monitors the location of the wireless mobile unit 201 of the user at regular intervals. Note the wireless mobile unit 201 may contain the functionality needed to locate itself, and may send results to the location service controller 301 (through a controlling base station and WSC 220); such as through GPS or modified GPS circuitry within the wireless mobile unit 201 itself. Alternatively, the location can be determined in a known manner through triangulation, etc., at the location action server 221 or WSC 220. Those familiar with wireless location technology/functioning will recognize that for the services disclosed herein, it does not matter whether location results are calculated in the network or in the wireless mobile unit 201 itself.

For example, and as is clear to those skilled in the art, there are various ways in which the illustrative embodiment can ascertain the location of wireless mobile unit 201. For example, wireless mobile unit 201 can include a satellite position system receiver (e.g., a Global Positioning System (GPS) receiver, etc.) so that wireless mobile unit 201 can determine its own latitude and longitude. In such a case, wireless mobile unit 201 provides its location to a controlling base station, to WSC 220 and eventually to location-based server 221 when requested. An example of such an arrangement is taught in U.S. Pat. No. 5,479,482, entitled "Cellular Terminal For Providing Public Emergency Call Location Information," issued Dec. 26, 1995.

In accordance with another technique, wireless mobile unit 201 and location determining server 303 may share the task of computing the latitude and longitude of wireless mobile unit 201. In such a case, wireless mobile unit 201 provides an indicium of its location through a controlling base station and WSC 220, to location determining server 303 of location-based server 221 when requested. An example of such an arrangement is described by G. Vannucci and R. E. Richton in pending U.S. patent applications Ser. No. 08/927,432, and 08/927,434.

In accordance with other techniques, either wireless mobile unit 201 or base stations 203-1 through 203-4 use of terrestrial triangulation techniques, in a well-known fashion, to determine the location of wireless mobile unit 201 based on the time-of-arrival or direction-of-arrival of signals transmitted from each other. It will be clear to those skilled in the art how to determine the location of wireless mobile unit 201 for the purposes of the present invention, and that the reporting of location to location determining server 303 (through a controlling base station and WSC 220) at regular intervals requires merely adding a timer, for example. It will similarly be clear to those skilled in the art that wireless location determination systems will have a certain inherent accuracy, and that they generally report a confidence or uncertainty level and that that level might need to be considered when invoking any location-based service. Factoring in consideration of the areas of uncertainty will be part of any location-based service but will not be described at length here, as the considerations should be evident. For example, when criteria for invoking services are examined, the uncertainty/confidence must be considered. Depending on the nature of the action/service, different confidence levels might appropriately be invoked. However, because this is a secondary factor in invoking location-based services, its use would probably be better left to the administrative parts of location-based services rather than set by users in most cases.

Following initialization of the service (Step 400) as explained in FIG. 5, the process may proceed to Step 402 within the location-based server 221. In step 402, a record of the wireless mobile unit 201, the location criteria or geographic relationship (designated target remote location, threshold, etc.) and the information to be obtained is established. This information is preferably stored in a record in a location based service database 302, in association with information identifying the wireless mobile unit 201 (such as it's phone number, for example) and in association with information identifying the external information sources 310 from which information is to be obtained or gathered (such as the phone number for the Internet or a user's IPA access, etc.). It should be noted that the record stored in the location-based service database 302 may include all necessary information to carry out the retrieval of information, or may be linked to existing information, such as a known telephone number of the wireless mobile unit 201 and/or known external information source 310 numbers. The aforementioned record and other stored information may be stored in a geographically oriented database, such as are associated with GISs. Location based controller 301 records that such a record exists. At this point in the location-based controller 301 initiates the criteria checking shown in steps 404 and 406.

The criteria checking steps 404 and 406 are the heart of the system. In step 404, the location of wireless mobile unit 201 is preferably periodically determined/received. This is preferably done at periodic intervals, e.g., once per second. Next, in step 406, the retrieved criteria are checked at regular intervals, typically timed to mesh with the timing of step 404. For example, in step 406 it is determined whether or not the location information received in step 404 indicates that the wireless mobile unit 201 has satisfied the preset geographic relationship with the target location, e.g. is it within a threshold distance (e.g., 5 miles) of the target location (e.g., "airport"). These two timed processes are "merged" in a manner to check whether the location of the wireless mobile unit 201 of the user meets the criteria or geographic relationship with the target that has been set.

It should be noted that the record storage and criteria checking of steps 402–406 need not be limited to a single wireless mobile unit 201 or to a single target location. For example, if a family of users has two or more wireless mobile phones, for example, then they may designate that information be retrieved when either of the two wireless mobile phones meets the set geographic relationship. This can be set and stored in location-based service database 302. Further, retrieval of one set of information can be triggered by either wireless mobile phone meeting a first geographic relationship with a home of the users, for example, and retrieval of a second set of information can be stored in association with only one of the wireless mobile phones, for airport related information, for example. Any combination of the above is possible and is within the scope of the present invention.

In addition, for a single wireless mobile unit 201, multiple geographic relationships can be stored in association therewith to trigger similar or different information to be retrieved. For example, when a wireless mobile unit 201 of a user satisfies a first set geographic relationship with a first target location (e.g. home), retrieval of a first set of information can be triggered (e.g. traffic information). When the same wireless mobile unit 201 satisfies a second set geographic relationship with a second target location (e.g. airport), retrieval of a second different set of information can be triggered (e.g. airline flight information). Accordingly, upon the wireless mobile unit 201 satisfying either of the set geographic relationships with either of the respective target locations, information will be retrieved based on the respective target. Therefore, information identifying one or more various wireless mobile units can be stored in association with information of various target remote locations and in association with various set geographic relationships thereof and information to be retrieved.

Further, step 404 can be performed using criteria established outside of step 400. Also note that there will be service provisioning steps that the providers of services described here will undertake before users can employ any steps in FIG. 4. These provisioning steps would include, for example, initiate billing and check that the end-to-end communications protocols required for subsequent steps of the service disclosed are ready. Authentication/security functions may also be established to further protect users against unauthorized disclosures of data regarding their whereabouts (position/location), which many would want to keep private. Methods to perform such provisioning steps are well-known to those skilled in the art, as these are normal functions of public telephone networks for well-known services such as call waiting, caller-ID, etc.

If the criteria are met in step 406, information is retrieved in step 408. This is easily accomplished since the location-based server 221 knows the phone number of the remote external information source to be contacted to retrieve the desired information. If not, location of the wireless mobile unit 201 is monitored in step 404. As noted previously, the information is retrieved by the location-based server 221 contacting an external information source 310 (the source to be called and phone number are stored in location-based service database 302 in association with the geographic relationship trigger). If the criteria are not met, the condition is checked again (periodically).

Thereafter, the information is sent to the wireless mobile unit 201 in step 410. It should be noted that if the IPA is to be contacted prior to gathering information from another external source, this is stored in the location-based service database 302 and is performed when the geographic relationship is satisfied. Thereafter, specific information, as dictated by the IPA 330 is retrieved, modified, and sent to the wireless mobile unit 201 through WSC 220 and a controlling base station. Alternatively, depending on how the retrieval is programmed, information could be retrieved and modified after retrieval, and then sent to the wireless mobile unit 201 (such as a situation where traffic information for a specific region is retrieved, and then an alternate route is selected and sent to the wireless mobile unit 201, for example).

In the case where the criteria is met in step 406, the location-based controller 301, having "deduced" that the criteria has been met by comparing the criteria stored in location-based database 302 with the most recent location determination result from the location determining server 303, sends a signal to retrieve the information. This may include calling a specific telephone number (e.g., the airport or traffic hotline) or searching a specific area on the internet 320. One of ordinary skill in the art familiar with this type of pre-programmed controller will recognize that a variety of signals may be used from this point to establish, validate, and invoke the computer-to-computer communications that enables this step (from location-based server 221 to the remote external information source 310). The communications may take place via the Public Switched Telephone Network (PSTN) or any ordinary or extraordinary means.

Figure 6:
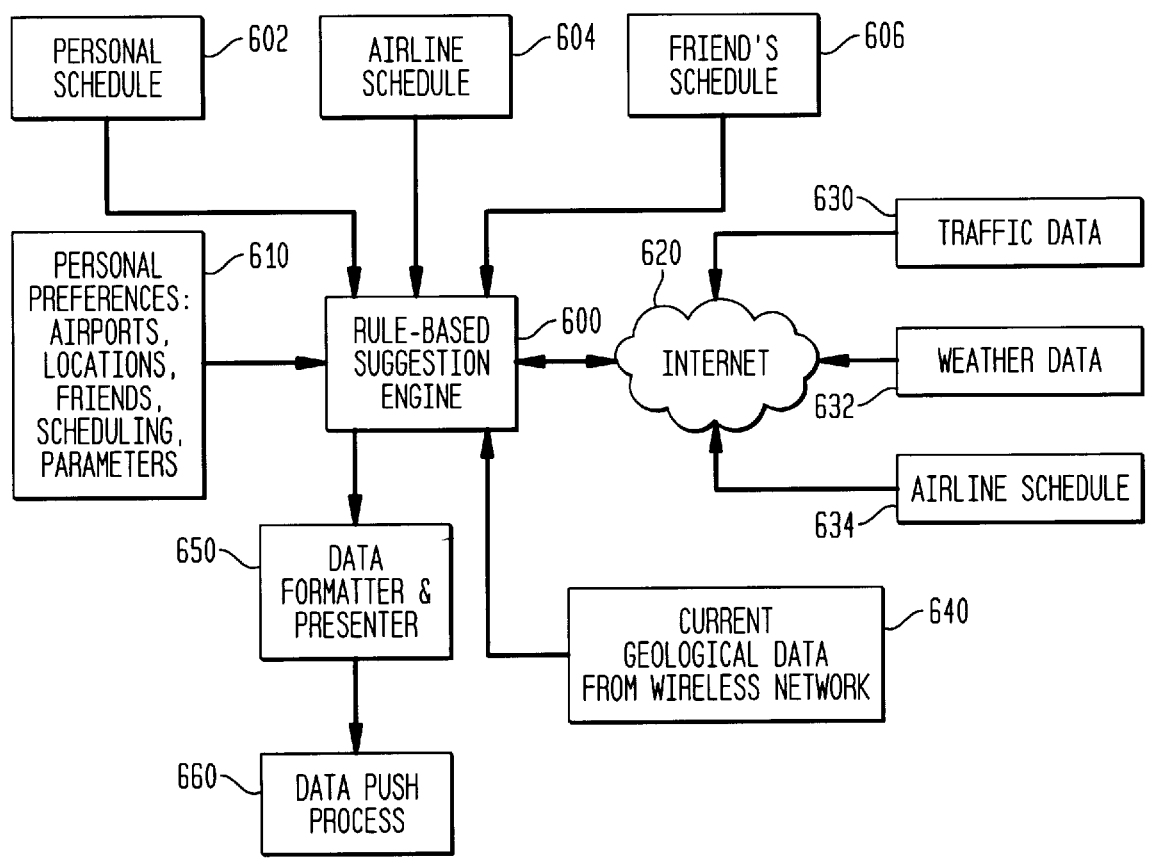
FIG. 6 illustrates an embodiment of the present invention including use of an IPA.

FIG. 6 provides an illustration of how the IPA 330 can be used in connection with the present invention to coordinate rule-based information with location-based information. Specifically, one preferred embodiment of the present application utilizes located-based information to triggered the obtaining or gathering of information from an external source such as the Internet, and the eventual transmitting of this information from an external source to a user. However, as shown in FIG. 6, another preferred embodiment utilizes IPA 330 to access different types of data and to apply preprogrammed rules so that more specific or modified information can eventually be output to a user of a wireless mobile unit 201.

As shown in FIG. 6, the IPA 330 includes a rule-based suggestion engine 600. This rule-based suggestion engine 600 can be preprogrammed as shown by box 610, with personal preferences of the user such as airports, locations, friends, scheduling parameters. The rule-based suggestion engine 600 of IPA 330 is analogous to an expert system that follows rules such as "if a user can reach a next destination within 2 hours of his existing schedule, and still have time to meet a designated friend based on a friend's schedule, then transmit to the wireless mobile unit of a user, a revised flight schedule when the user is more than 5 miles from the airport". The rule-based suggestion engine 600 is preferably not only preprogrammed with personal preferences 610 of the user to establish particular rules, but can further pull or receive information from other external sources such as a personal schedule 602, and airline schedule 604, and a friend's schedule 606. Such information can be preprogrammed or accessed by IPA 330 in a known manner.

In addition, the IPA 330 is also connectable to the Internet 620. Via the Internet 620, the IPA 330 can receive external information such as traffic data 630, weather data 632, airline schedules 634, etc. It should be noted that the examples of information that can be received from the Internet are programmed or otherwise accessed by an IPA 330 are merely that, examples, and should not be considered limiting in any manner.

Once the rule-based suggestion engine 600 of IPA 330 is programmed with the particular desired rules so that desired information can be accessed, it then merely awaits the current geolocation data from the wireless network 640, which indicates the location of a wireless mobile unit 201 in one of a number of ways, so as to know when to trigger the application of the rules to the data and to trigger the output of data to the wireless mobile unit 201. Once the threshold, such as 5 miles from the airport, is triggered based upon the location of the wireless mobile unit 201, information is retrieved and modified and results of the expert system of IPA 330 are output from rule-based suggestion engine 600, formatted in element 650, and eventually output in a data push process 660 to the wireless mobile unit 201, through location-based server 221, WSC 220, and a controlling base station. It should be noted that FIG. 6 is merely exemplary to provide an illustration of how diverse data can be considered by a rule-based suggestion engine 600 of an IPA 330 to apply rules to data or information received; and to eventually modify and convey modified information to the user of a wireless mobile unit 201.

Figure 7:
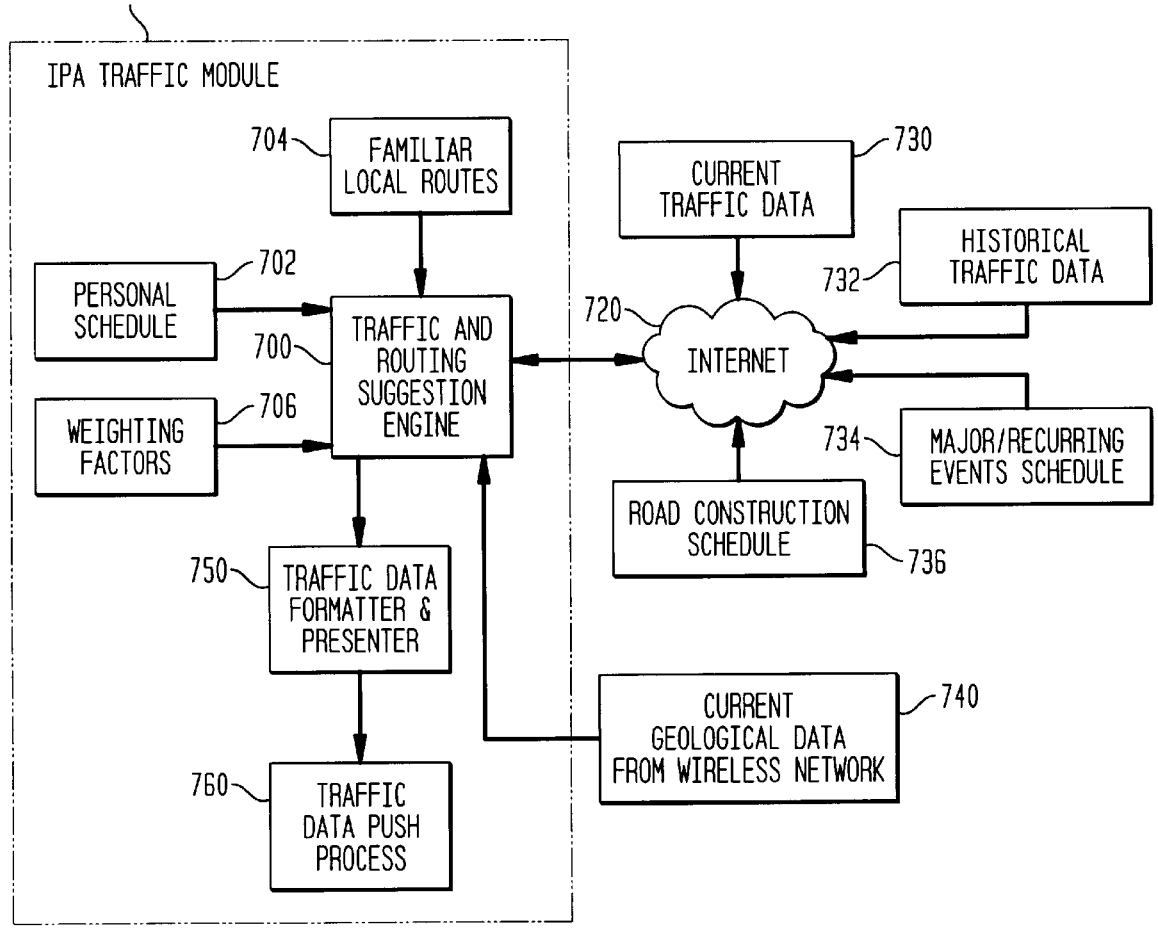
FIG. 7 illustrates an embodiment of the present invention including use of an IPA in a traffic module example.

FIG. 7 is an example of how an IPA 330 is utilized in connection with the present invention to process data and redirect the traveler whose trip might be delayed by traffic. The IPA 330 is designated in this example of FIG. 7, by an IPA traffic module 780. The IPA traffic module includes a basic engine, denoted by traffic and routing suggestion engine 700. Traffic and routing suggestion engine 700 of IPA traffic module 780 is connected to the Internet 720, and therefore has access to current traffic data 730, historical traffic data 732, major/recurring events schedules 734 and road construction schedules 736. It further can be programmed or has access to a personal schedule of a user 702, familiar local routes of a user 704, and weighting factors 706. In addition, it receives current geolocation data from the wireless network 740, thereby enabling it to monitor positions of the wireless mobile unit 201 in any of the manners previously described.

In this specific example, a user of wireless mobile unit 201 desires to receive traffic information which can normally be obtained by monitoring the location of the wireless mobile unit 201 and having location-based server 221 access the Internet 320 to obtain and eventually send the wireless mobile unit 201 particular traffic information. However, utilizing IPA 330 and the example shown in FIG. 7, not only can traffic information be received, but traffic problems can be identified (by outputting modified traffic information) and the user can be rerouted around such traffic problems (by receiving new route information) as will be explained as follows.

IPA traffic module 780 of FIG. 7 is somewhat similar to the IPA 330 described with regard to FIG. 6. The heart of the process is traffic and routing suggestion engine 700 which is a rule-based suggestion engine analogous to that previously described with regard to FIG. 6. The traffic and routing suggestion engine 700, is this current example, is programmed with a rules that initiate processing and eventual formatting of traffic data in element 750 and pushing or sending of processed or modified traffic data indicating a heavy traffic flow for example (or new route information) in element 760 to the wireless mobile unit 201. The program rules within traffic and routing suggestion engine 700 trigger the output of information when an estimated travel time of a user, for example, exceeds certain preset limits or thresholds (e.g., 20% above normal).

More specifically, the traffic and routing suggestion engine 700 can be programmed so as to understand familiar local routes 704 and continually draw data through Internet 720 from external sources to obtain current traffic data 730, historical traffic data 732, major/recurring events schedule 734 and road construction schedules 736. The traffic and routing suggestion engine 700 can then compare the user's current location, obtained from current geolocation data element 740 in any of the manners described previously, to draw conclusions about whether to suggest a change in routes. Data input can be weighted using weighting factor 706, according to rules such as current traffic data 730 being much more influential than historical traffic data 732 for example, so as to have the traffic and routing suggestion engine 700 "decide" whether to output a recommendation to change routes to the wireless mobile unit 201. Other aspects, such as a major event, including sporting events or concert events for example, and road construction schedules may have a large weighting factor which would strongly dictate the issuance of rerouting information. The action taken in the instances where the traffic and routing suggestion engine 700 "decides" that rerouting is a good idea is the proactive push of traffic information to the wireless mobile unit 201 which is accomplished in a manner previously discussed with regard to the flowchart of FIG. 4 for example. The suggestion of alternative routes is an obvious extension of this, wherein stored mapping information can be used in conjunction with the various aspects of IPA 330 as shown in FIG. 7, to not only provide information indicating heavy traffic flow to the wireless mobile unit 201, but also alternative route suggestions.

Figure 8:
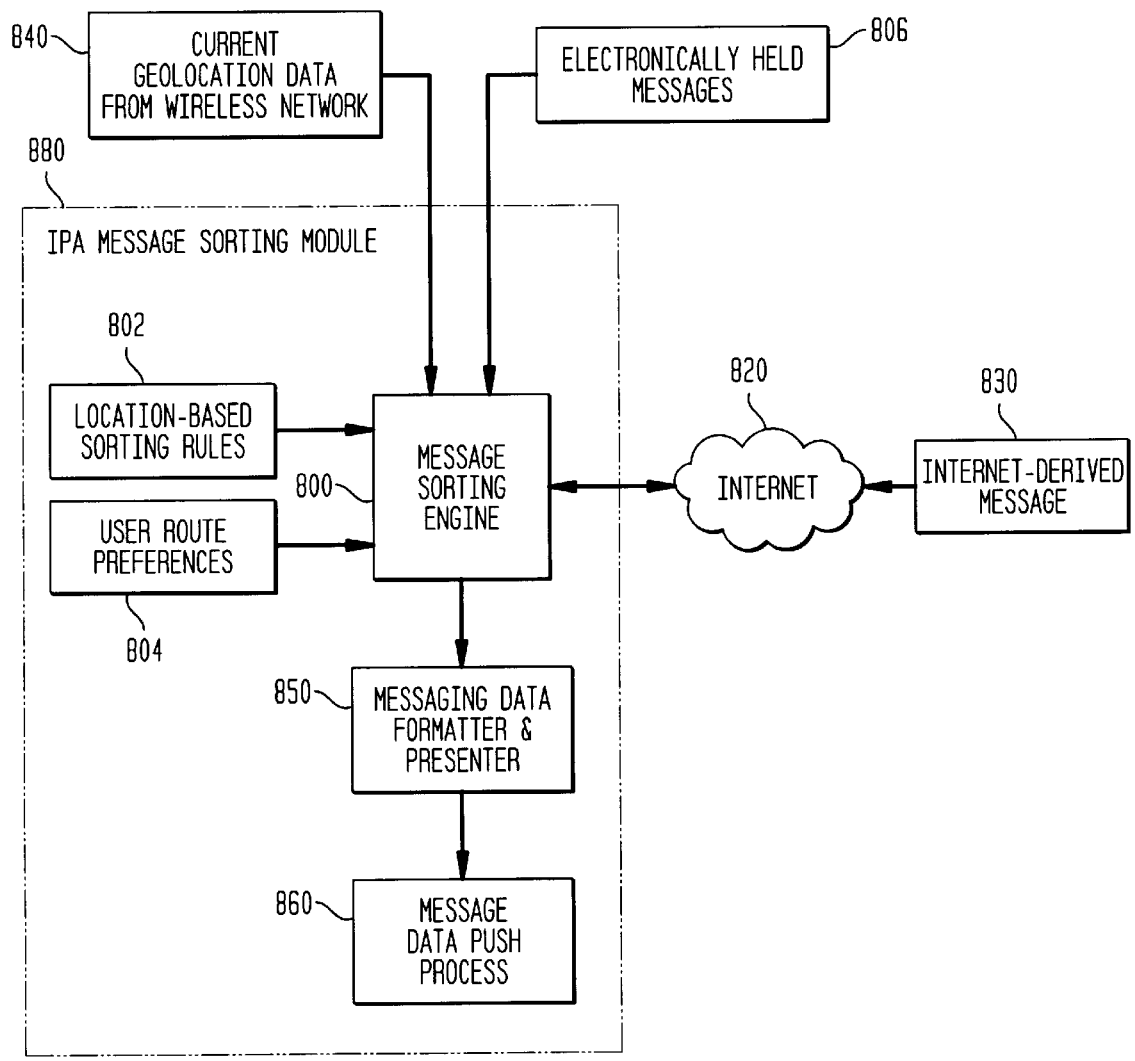
FIG. 8 illustrates an embodiment of the present invention including use of an IPA in a message sorting module example.

Another example of how an IPA 330 can be used in connection with the location-based server 221 of the present invention, is an example wherein the IPA 330 is an IPA message sorting module 880 as shown in FIG. 8. In this case, the sorting of personal information messages such as email, facsimile and voicemail messages can be done by message sorting engine 800 of IPA message sorting module 880. The message sorting engine 800 can be programmed with location-based sorting rules 802 and user route preferences 804. It can receive external information such as electronically held messages 806, along with location information as identified by current geo-location data element 840. The message sorting engine 800 is further connected to the Internet 820, to obtain Internet derived messages 830 for example.

More specifically, FIG. 8 schematically illustrates how electronically held messages are considered by a rule-based message sorting engine 800 to eventually output modified message data, which is formatted in message data formatter and presenter 850, and eventually pushed as modified message data via 860 to a wireless mobile unit 201 depending upon the user's position or location. As with previous examples, the heart of this process is rule-based message sorting engine 800, which is analogous to rule-based suggestion engine 600 to FIG. 6 as described previously. The message sorting engine 800 is programmed with rules, including location-based sorting rules 802, that enable message modification by selection and sending of particular messages, or portion of messages, depending upon a user's location, and perhaps other aspects including the user's route or particular time of day. By understanding a user's route preference 804, which enables the message sorting engine 800 to identify a user's route currently traveled, the message sorting engine 800 can compare the user's current location, obtained from element 840, and the user's route and his/her proximity to a destination location (such as the office, for example) to draw conclusions in a rule-based or expert system manner about what messages or message portions to forward, and with what level of detail. This sorting can be fairly simple, such as only being done once per day when the user approaches or is within 5 miles of the office to summarize the most important messages received overnight for example; and could also be used in a similar manner to summarize personal information messages (email, voicemail, facsimile, etc.) when a user is approaching home. As such, the wireless mobile unit 201 would receive email type messages or portions thereof, when within a threshold, such as 5 miles for example, of a certain remote location such as home, or office, or both.

The implementation of such message sorting based on the message's originator, content, etc. is well known to those of ordinary skill in the art and is commonly used with IPA devices. However, it is not commonly known to tie the user's location to the sorting or outputting of such information, and is certainly not common to use the user's location as derived from a wireless system as is taught in connection with the present application. It should be noted that message information can be any type of personal information which can be output and sent to a wireless mobile unit 201 in electronic form such as email or facsimile information, or in an audible form, based upon voicemail information for example. In addition, voicemail information can be converted to data for transmission to a wireless mobile unit 201; and/or email information can be converted to audible information for output to the wireless mobile unit 201 as well. Accordingly, the present application should not be limited to the type of information which can be accessed nor to the type of information which can be output to wireless mobile unit 201. It should be understood that other information can be output in a manner similar to that described generically with regard to FIG. 6, and specifically with regard to traffic information of FIG. 7 and message sorting information with regard to FIG. 8. Such information that can be processed and output to wireless mobile unit 201 includes, but is not limited to, airline flight and schedule information; summaries of important events from a user's calendar or schedule; etc.

One further example of location-based information delivery is presented here, to emphasize the generality of the method. Consider a subscriber to this type of location-based service system or method who has an appropriate wireless mobile unit 201 and is served by a network enabled with the ability to determine the phone's location and also has an IPA 330 assigned to him/her. The IPA 330 may be programmed with "knowledge" of the subscriber's particular interest, such as collecting art of a certain type for example. This type of art might be frequently available through the Internet (perhaps in auction sites) and advertised there. The subscriber, when traveling in circumstances that allow him/her to pursue their collecting hobby, can therefore request to be notified when objects of interest both become available and when he/she are in proximity to the seller. The IPA 330 periodically searches appropriate auction sites of the Internet and pulls data for comparison with the subscriber profile and current location as disclosed in FIGS. 3–5. Thus, the location-based system and method of the present invention can use location-based information of the wireless mobile unit 201 of the user to convey relevant information back to the user in a timely manner. Because this collectable is of special interest only when it can be viewed in person, this may be a helpful criteria to pursuit and enjoyment of this type of collecting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the structure of location of location-based service database 302 is not limiting and need only store, in some fashion, the required information. How information is stored is not limitive of the present invention. Further, the location of various components or information storers of the location-based server 221 is not limitive of the present invention. The components can be in a single unit as shown in FIG. 3, or can be located apart from location-based controller 301. Only operative connection between components is important. The location-based server 221 of FIG. 3 is merely a description of a preferred structure.

What is claimed is:

1. An apparatus, comprising:
   a controller, adapted to receive information indicating position of a wireless communications device;
   a memory, adapted to store a telephone number of a remote information source, information identifying the wireless communication device and instruction information in association with the information identifying the wireless communication device,
   the controller being adapted to output information for the wireless communication device based upon the stored instruction information, when the received information indicates that the position of the wireless communication device has satisfied a geographic relationship with a remote location, and to retrieve information for output to the wireless communication device using the telephone number of the remote information source.

2. The apparatus of claim 1, wherein the information is output to the wireless communication device and received at the wireless communication device.

3. The apparatus of claim 1, wherein the geographic relationship is satisfied when the position of the wireless communication device is within a designated distance of the remote location.

4. The apparatus of claim 1, wherein the controller is adapted to compare position information of the wireless communication device to stored position information of the remote location and is adapted to determine when the wireless communication device has satisfied the geographic relationship.

5. The apparatus of claim 1, wherein the wireless communication device is a wireless phone.

6. The apparatus of claim 1, wherein the position information indicating position of the wireless communication device is received from a global positioning system (GPS) within the wireless communication device.

7. The apparatus of claim 1, wherein the position information indicating position of the wireless communication device is received from an assisted global positioning system (assisted GPS).

8. The apparatus of claim 1, wherein the information output includes traffic information.

9. The apparatus of claim 1, wherein the information output includes airline information.

10. The apparatus of claim 1, wherein the information output includes personal information.

11. The apparatus of claim 1, wherein the memory stores position information of a plurality of remote locations in association with the information identifying a wireless communication device.

12. The apparatus of claim 11, wherein the controller is adapted to output information to the wireless communication device upon receiving information indicating that the position of the wireless communication device is within a designated distance of the one of the plurality of remote locations.

13. The apparatus of claim 1, wherein the memory stores information identifying a plurality of wireless communication devices in association with position information of the remote location.

14. The apparatus of claim 13, wherein the controller is adapted to output a control information to a wireless communication device upon receiving a signal indicating that the position of a respective one of the plurality of wireless communication devices is within a designated distance of the remote location.

15. The apparatus of claim 12, wherein the memory stores information identifying a plurality of wireless communication devices in association with position information of at least one of the plurality of remote locations.

16. The apparatus of claim 15, wherein the controller is adapted to output information to a wireless communication device upon receiving a signal indicating that the position of a respective one of the plurality of wireless communication devices is within a designated distance of the one of the remote locations.

17. The apparatus of claim 1, wherein the controller is adapted to retrieve the information from the remote information source through telephone lines.

18. The apparatus of claim 1, wherein the controller is adapted to retrieve the information from the remote information source through wireless communication.

19. The apparatus of claim 1, wherein the stored information identifying the wireless communication device includes a telephone number.

20. The apparatus of claim 1, wherein the information adapted to be output includes information associated with the remote location.

21. The apparatus of claim 2, wherein the information adapted to be output includes information associated with the remote location.

22. An apparatus, comprising:
a memory, adapted to store a telephone number of a remote information source, in association with information identifying a wireless communication device and position information of a remote location; and
a controller, adapted to output information for the wireless communication device when determining that a position of the wireless communication device has satisfied a geographic relationship with the remote location, and to retrieve information for output to the wireless communication device using the telephone number of the remote information source.

23. The apparatus of claim 22, wherein the information is output to the wireless communication device and received at the wireless communication device.

24. The apparatus of claim 22, wherein the position of the wireless communication device is determined at the controller through triangulation.

25. The apparatus of claim 22, wherein the geographic relationship is satisfied when the position of the wireless communication device is within a designated distance of the remote location.

26. The apparatus of claim 22, wherein the information adapted to be output includes information associated with the remote location.

27. The apparatus of claim 23, wherein the information adapted to be output includes information associated with the remote location.

28. A method, comprising:
storing a telephone number of a remote information source in association with position information of a remote location and information identifying a wireless communication device;
receiving information indicating a position of the wireless communication device; and
outputting information for the wireless communication device when the received information indicates that the position of the wireless communication device has satisfied a geographic relationship with the remote location.

29. The method of claim 28, wherein the information is output to the wireless communication device and received at the wireless communication device.

30. The method of claim 28, wherein the geographic relationship is satisfied when the wireless communication device is within a designated distance of the remote location.

31. The method of claim 28, further comprising: comparing the received position information of the wireless communication device to the stored position information of the remote location and outputting the information based upon the comparison.

32. The method of claim 28, wherein the information indicating position is received from a wireless telephone.

33. The method of claim 28, wherein storing includes storing position information of a plurality of remote locations in association with information identifying a wireless communication device.

34. The method of claim 33, wherein outputting includes outputting information upon receiving information indicating that the position of the wireless communication device is within a designated distance of the one of the plurality of the remote locations.

35. The method of claim 28, wherein the information identifying a wireless communication device includes a telephone number.

36. The method of claim 28, wherein a signal requesting information from the remote information source is output through telephone lines.

37. The method of claim 28, wherein a signal requesting information from the remote information source is output through wireless communication.

38. The method of claim 28, wherein the information output includes traffic information.

39. The method of claim 28, wherein the information output includes airline information.

40. The method of claim 28, wherein the information output includes personal information.

41. The method of claim 28, wherein the output information includes information associated with the remote location.

42. The method of claim 29, wherein the output information includes information associated with the remote location.

43. An apparatus comprising:
a controller; and
a memory, adapted to store information identifying the wireless communication device and instruction information;
the controller adapted to receive information indicating position of a wireless communications device, to access external information from an intelligent personal assistant (IPA) and output information for the wireless communication device based upon the stored instruction information and accessed external information when received information indicates that the position of the wireless communication device has satisfied a geographic relationship with a remote location, and the IPA adapted to modify the output information based on rules for the IPA included in the stored instruction information.

44. The apparatus of claim 43, wherein the information is output to the wireless communication device and received at the wireless communication device.

45. The apparatus of claim 43, wherein the geographic relationship is satisfied when the position of the wireless communication device is within a designated distance of the remote location.

46. The apparatus of claim 43, wherein the controller is adapted to compare position information of the wireless communication device to stored position information of the remote location and is adapted to determine when the wireless communication device has satisfied the geographic relationship.

47. The apparatus of claim 43, wherein the information output includes traffic information.

48. The apparatus of claim 43, wherein the output information includes modified traffic information, wherein the IPA modifies traffic information received from an external source based upon stored rules, to produce modified traffic information for output to the wireless communication device.

49. The apparatus of claim 43, wherein the output information includes route information, wherein the IPA receives traffic information from an external source and produces route information for output to the wireless communication device based upon the received traffic information.

50. The apparatus of claim 43, wherein the information output includes airline information.

51. The apparatus of claim 43, wherein the output information includes modified airline information, wherein the IPA modifies airline information received from an external source based upon stored rules, to produce modified airline information for output to the wireless communication device.

52. The apparatus of claim 43, wherein the information output includes personal information.

53. The apparatus of claim 52, wherein the personal information includes electronic mail.

54. The apparatus of claim 43, wherein the output information includes modified personal information, wherein the IPA modifies personal information received from an external source based upon stored rules, to produce modified personal information for output to the wireless communication device.

55. The apparatus of claim 52, wherein the personal information includes voicemail.

56. The apparatus of claim 43, wherein the output information includes information associated with the remote location.

57. The apparatus of claim 44, wherein the output information includes information associated with the remote location.

58. The apparatus of claim 44, wherein the output information includes information associated with the remote location.

* * * * *